United States Patent
Hunter et al.

(10) Patent No.: US 8,525,857 B2
(45) Date of Patent: Sep. 3, 2013

(54) SYSTEM AND METHOD TO IMPROVE SIDE 1 TO SIDE 2 IMAGE ON PAPER MAGNIFICATION DIFFERENCE AND IQ PERFORMANCE

(75) Inventors: Jonathan B. Hunter, Marion, NY (US); Andrew James Bonacci, Webster, NY (US); David Mark Kerxhalli, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 257 days.

(21) Appl. No.: 13/085,830

(22) Filed: Apr. 13, 2011

(65) Prior Publication Data

US 2012/0262528 A1   Oct. 18, 2012

(51) Int. Cl.
   B41J 2/41   (2006.01)
   B41J 2/47   (2006.01)
   H04N 1/04   (2006.01)

(52) U.S. Cl.
   USPC ............................. 347/132; 347/232; 358/474

(58) Field of Classification Search
   None
   See application file for complete search history.

(56) References Cited

U.S. PATENT DOCUMENTS

| | | | |
|---|---|---|---|
| 4,278,344 A | 7/1981 | Sahay | |
| 5,555,084 A | 9/1996 | Vetromile et al. | |
| 5,970,295 A | 10/1999 | Samizo | |
| 6,133,932 A * | 10/2000 | Webb et al. | 347/232 |
| 6,389,260 B1 | 5/2002 | Kataoka et al. | |
| 6,419,222 B1 | 7/2002 | Morrison et al. | |
| 6,529,643 B1 | 3/2003 | Loce et al. | |
| 6,700,600 B1 | 3/2004 | Sandstrom et al. | |
| 6,814,004 B2 | 11/2004 | Lofthus et al. | |
| 6,816,269 B1 | 11/2004 | Loce et al. | |
| 6,920,307 B2 | 7/2005 | Howe | |
| 7,039,348 B2 | 5/2006 | Kerxhalli et al. | |
| 7,158,751 B2 | 1/2007 | Howe | |
| 7,272,334 B2 | 9/2007 | Moore et al. | |
| 7,277,669 B2 | 10/2007 | Howe | |
| 8,031,219 B2 | 10/2011 | Kondo | |
| 2006/0092264 A1 | 5/2006 | Matsuzaki et al. | |
| 2006/0099019 A1 | 5/2006 | Howe | |
| 2006/0232661 A1 | 10/2006 | Niland et al. | |
| 2007/0047048 A1 | 3/2007 | Shimizu | |
| 2007/0139715 A1 | 6/2007 | Kazama et al. | |
| 2008/0278735 A1 | 11/2008 | Wang et al. | |
| 2010/0020364 A1 * | 1/2010 | Kerxhalli et al. | 358/474 |
| 2010/0309526 A1 | 12/2010 | Kulkarni et al. | |

OTHER PUBLICATIONS

U.S. Appl. No. 12/194,958, filed Aug. 20, 2008, Kulkarni; Rakesh Suresh; et al.
Office Action dated Sep. 20, 2011, U.S. Appl. No. 12/177,376, filed Jul. 22, 2008.

* cited by examiner

Primary Examiner — Stephen Meier
Assistant Examiner — Alexander C Witkowski
(74) Attorney, Agent, or Firm — Fay Sharpe LLP

(57) ABSTRACT

Document processing systems and duplex printing methods are presented in which side 1 to side 2 image on paper (IOP) magnification errors are mitigated by use different speeds for raster output scanner (ROS) for scanning images for different final print sides, and by selective use of electronic registration adjustment by adding or removing sub-pixels from the image data to compensate for ROS speed change overshoot or undershoot.

20 Claims, 10 Drawing Sheets

SYSTEM AND METHOD TO IMPROVE SIDE 1 TO SIDE 2 IMAGE ON PAPER MAGNIFICATION DIFFERENCE AND IQ PERFORMANCE

BACKGROUND

The present exemplary embodiment relates to document processing systems such as printers, copiers, multi-function devices, etc., and more particularly to mitigation of side 1 to side 2 process magnification errors (sometimes referred to as "show-thru" or "see-thru error) in printing engines and duplex printing methods for printing images on two sides of a printed substrate. This form of image-on-paper (IOP) magnification error is seen as a difference in the image size for images printed on two different sides of a printed substrate, and is unacceptable in many customer applications. Show-thru errors are mainly caused by the substrate shrinking when fed through a fusing station after the image is transferred to the first side of the substrate and before an image is transferred to the second side. In particular, conventional duplex printing systems include a duplex routing station and media inverter downstream of the fusing station that reintroduce a printed sheet into the transfer path before the once-printed sheet has had time to be reacclimated to the ambient temperature. The side 2 image is then transferred to the shrunken paper and becomes larger relative to the side 1 image once the paper resumes the original size. This results in a process magnification error evident as a show-thru discrepancy between the image sizes on either side of the substrate, with the side 2 image appearing larger than the side 1 image in the process direction.

The error can be addressed somewhat by shifting the margin for the side 2 image in order to evenly distribute the magnification error equally on both sides. However, this approach does not reduce the process magnification error, but instead makes it less apparent upon visual inspection.

Image data may be manipulated to artificially shrink the side 2 image, for instance, by removing certain data, but this leads to image defects.

Another technique to address side 1 to side 2 IOP magnification is described in U.S. Patent Application Publication No. 2010/0020364, published Jan. 28, 2010 and filed as Ser. No. 12/177,376 on Jul. 22, 2008, and assigned to the assignee of the present disclosure, the entirety of which is hereby incorporated by reference as if full set forth herein. That approach applies a different image magnification to side 2 that is used to compensate for paper shrinkage due to moisture lost from a fuser and other sources by implementing a method to change raster output scanner (ROS) motor polygon assembly (MPA) speed when imaging side 2 of a sheet compared to side 1.

The entirety of U.S. patent application Ser. No. 12/645,603, filed Dec. 23, 2009 and assigned to the assignee of the present disclosure, is hereby incorporated by reference as if full set forth herein. This application discloses techniques and apparatus for controlling the ROS motor polygon assembly (MPA) control frequency using a numerically controlled oscillator (NCO) to generate a clock frequency. The NCO output is used to source a square wave digital clock signal that is, in turn, used as an input to a ROS Motor Polygon Assembly (MPA) velocity control circuit. The ROS MPA control circuit regulates its speed by phase locking to this NCO generated ROS Master Clock (RMC) signal.

Other approaches for addressing side 1 to side 2 IOP magnification employ data modification, such as Contone High Resolution Image Path Electronic Registration (CHIPER), as shown in U.S. Patent Application Publication No. 2010/0309526, published Dec. 9, 2010 and filed as Ser. No. 12/480,945 on Jun. 9, 2009, and assigned to the assignee of the present disclosure, the entirety of which is hereby incorporated by reference as if full set forth herein. This technique compensates for the misregistration error caused by fuser shrinkage/stretching by adding/removing pixels or subpixels to/from the image prior to printing.

However, these techniques do not provide a complete solution, particularly in advance printing systems operated at high speeds. Consequently, a need remains for improved printing systems and duplex printing techniques by which the adverse effects of side 1 to side 2 IOP magnification errors can be mitigated and image quality performance can be improved.

BRIEF DESCRIPTION

The inventors have appreciated that fuser heating causes print media shrinkage and that media stretching may cause image enlargement, leading to image on paper (IOP) misregistration in two-side printing, and that prior attempts to compensate for this by adjusting ROS master clock (RMC) speed for latent image generation may be inadequate, particularly for high-speed printers due to physical limitations on the ability of a motor polygon assembly (MPA) to change speed between image panel zones of a photoreceptor belt (intermediate transfer belt or ITB). Moreover, combating extreme IOP misregistration solely using electronic registration process such as Contone High Resolution Image Path Electronic Registration (CHIPER) may lead to image quality defects (IQ errors).

The present disclosure provides document processing systems and printing methods that may be employed to address these and other shortcomings by selective use of different scanning speeds for generating latent images on a photoreceptor for images destined for different sides of a printed substrate, in combination with selective use of an electronic registration process such as CHIPER type techniques to add or remove pixels or sub-pixels in leading portions of images for the first panel following a scanning speed change. This approach may be successfully employed to utilize addition or removal of one or more scan lines in the slow-scan (process) direction to counteract overshoot or undershoot in the MPA operating speed, to facilitate use of the adjustable RMC technique for higher ITB travel speeds. The inventors have further appreciated that electronic registration processing can be employed in generally continuous fashion in combination with adjustment of ROS MPA speeds to effectively extend the ranges of the two individual approaches in combating IOP registration problems, particularly at high operating speeds. In certain implementations, the use of image data modification to counteract MPA speed overshoot or undershoot includes sub-pixel addition, removal, or both, depending on whether the speed is increasing or decreasing, and may be done for dynamically adjusted or pre-determined leading portions of images generated in the initial ITB panel zone following a ROS speed change to account for speed transitions extending beyond an inter-document zone (IDZ) or inter-panel zone (IPZ). Moreover, the continuous usage of CHIPER or other data adjustment techniques (e.g., for panels not following a speed change) can involve selective sub-pixel addition, removal or both in certain implementations.

In accordance with one or more aspects of the present disclosure, a document processing system is provided, which includes a photoreceptor and raster output scanners (ROS's) disposed along the photoreceptor path to generate a latent image on image panel portions of the photoreceptor based on a clock input. First and second ROS clocks provide outputs to the ROSs and a controller operates a given ROS according to the first clock signal if its image data is to be rendered on a first side of the substrate. Otherwise, the controller causes the ROS to use the second clock signal if the image data is destined for a second side of the final print media. The system also includes an electronic registration adjustment component which selectively adds or removes one or more sub-pixels to or from image data associated with a given image.

In certain embodiments, the electronic registration adjustment component selectively adds one or more sub-pixels to the data if a given image is generated using the second clock signal and selectively removes one or more sub-pixels if the given image is generated using the first clock signal. In certain embodiments, moreover, the electronic registration adjustment component performs the selective addition or removal only if the given image is the first image following a change in the selected clock signal. In certain embodiments, the electronic registration adjustment component selectively adds or removes one or more sub-pixels to or from an initial portion of the image data associated with the given image, where the initial portion corresponds to a motor polygon assembly (MPA) speed overshoot or undershoot during transition in changing between the first and second clock signals. In some embodiments, the initial portion of the image data associated with the given image is adjustable, and in others the initial portion is predetermined, such as during system calibration. In certain embodiments, moreover, the electronic registration adjustment component selectively adds at least one sub-pixel to the image data associated with the given image if the given image is generated using the first clock signal.

In accordance with further aspects of the present disclosure, a printing method is provided, including receiving image data for a print job page associated with a next photoreceptor panel zone portion of a photoreceptor, determining if the latent image being generated is to be rendered on a first side or a second side of a substrate, selecting a first ROS clock speed if the latent image is to be rendered on the first side of the substrate, and selecting a second ROS clock speed if the latent image is instead to be rendered on the second side of the substrate. The method further includes selectively adding at least one sub-pixel to the image data for the next photoreceptor panel zone portion if the image data is to be rendered on the second side of the substrate and the image data for the previous photoreceptor panel zone portion was to be rendered on the first side of the substrate, and selectively generating a latent image on the next panel zone portion of the photoreceptor according to the image data for the next photoreceptor panel using the selected clock speed.

Certain embodiments of the method further include selectively removing one or more sub-pixels if the image data is to be rendered on the first side of the substrate and the image data for the previous photoreceptor panel zone portion was to be rendered on the second side, for instance, to accommodate the MPA speed undershooting below the desired lower speed.

In certain embodiments, moreover, one or more sub-pixels are added if the image data is to be rendered on the first side of the substrate and the image data for the previous photoreceptor panel zone portion was to be rendered on the first side of the substrate. Certain embodiments also include removing one or more sub-pixels if the image is to be rendered on the second side of the substrate and the image data for the previous photoreceptor panel zone portion was to be rendered on the second side of the substrate.

Another printing method is provided in accordance with further aspects of the disclosure, including selecting a first or second ROS clock speed based on which side of the substrate the image data is for, as well as selectively adding one or more sub-pixels if the image data is to be rendered on the first side of the substrate and image data for the previous photoreceptor panel zone portion was to be rendered on the first side of the substrate. Certain embodiments of this method further include selectively removing at least one sub-pixel if the image data is to be rendered on the second side and the previous image data was to be rendered on the second side of the substrate.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
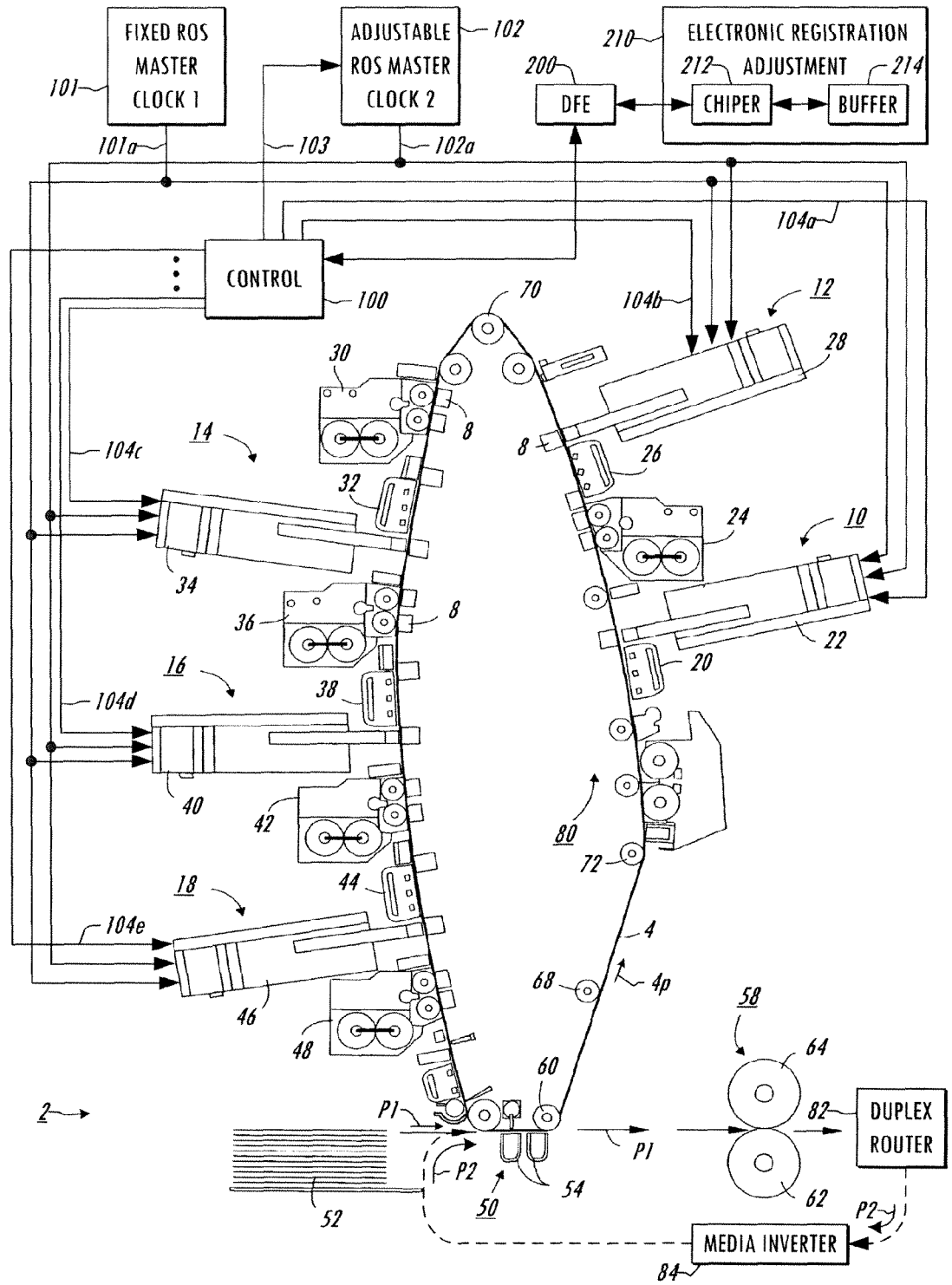
FIG. 1 is a simplified schematic diagram illustrating an exemplary multi-color document processing system with a plurality of selectively adjustable ROSs and an electronic registration adjustment component in accordance with one or more aspects of the present disclosure.

Referring now to the drawing figures, several embodiments or implementations of the present disclosure are hereinafter described in conjunction with the drawings, wherein like reference numerals are used to refer to like elements throughout, and wherein the various features, structures, and graphical renderings are not necessarily drawn to scale. The disclosure relates to correction of IOP process magnification errors in document processing systems and is hereinafter illustrated in the context of an exemplary multi-color document processing system having five raster output scanners and corresponding developers situated around a photoreceptor belt traveling at a generally constant speed along a circuitous closed path. It is noted, however, that various aspects of the disclosure can be implemented in association with systems employing any number of ROSs and using any form of intermediate transfer medium, including without limitation photoreceptor belts, drums, and the like. Moreover, the concepts of the present disclosure find utility in association with printing systems that include multiple transfer stages prior to printing on a final print media, wherein implementations of the disclosed concepts in any such alternate systems are contemplated as falling within the scope of the present disclosure and the appended claims.

Figure 2:
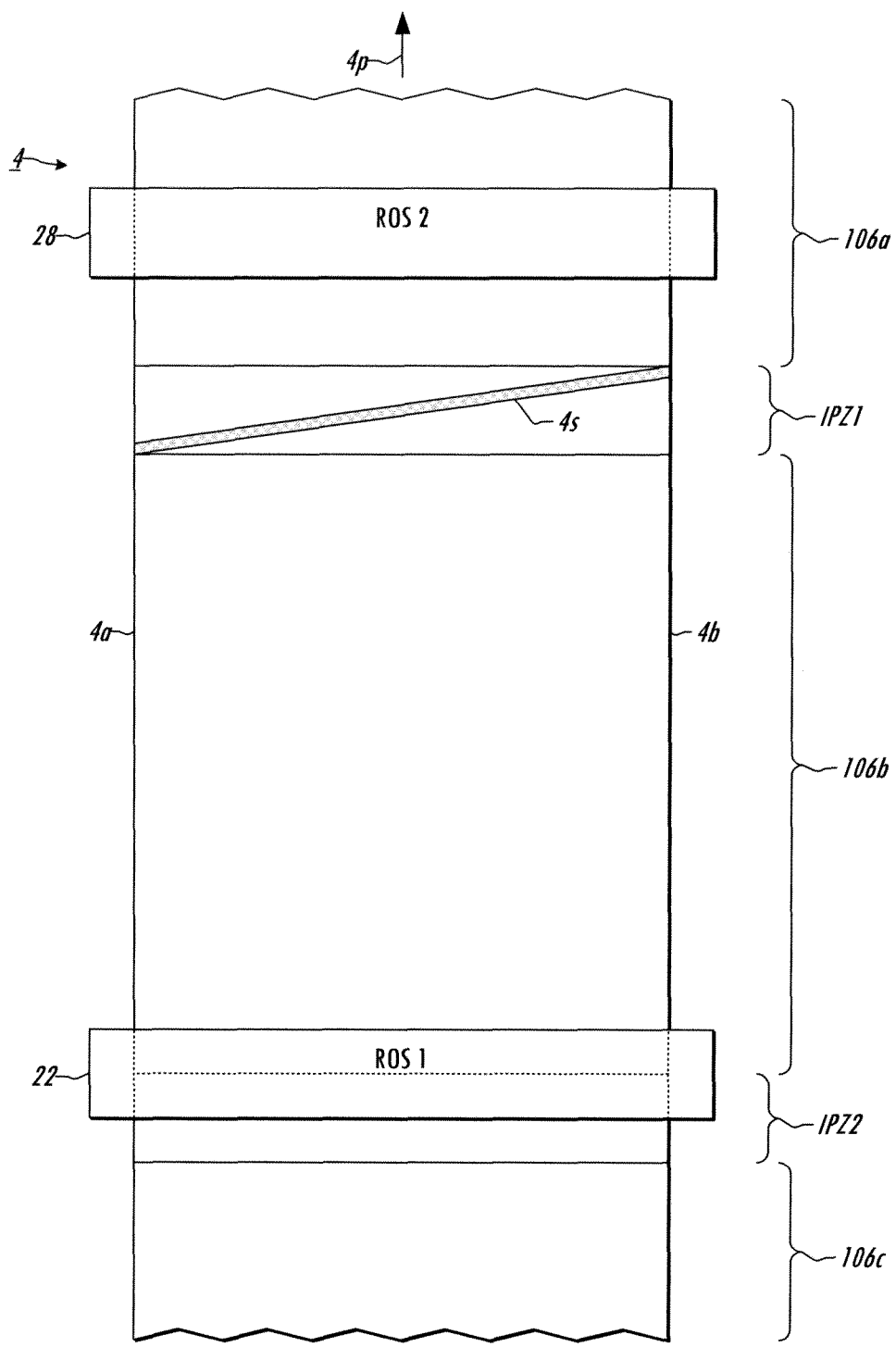
FIG. 2 is a partial top plan view illustrating a portion of the exemplary photoreceptor belt in the system of FIG. 1 with image panel zones separated by inter panel zones.

Referring initially to FIGS. 1 and 2, FIG. 1 illustrates an exemplary multi-color xerographic document processing system 2 including a continuous photoconductive (e.g., photoreceptor) imaging belt or intermediate transfer belt (ITB) 4 with first and second lateral sides 4a and 4b (FIG. 2 below). The photoreceptor belt 4 traverses a closed path 4p (counter-clockwise in the view of FIG. 1) of a drive assembly 80 having a series of rollers 68 and 70 or bars 8 at a substantially constant speed to move successive portions of its external surface sequentially beneath the various xerographic processing stations disposed about the path 4p in the system 2. The system 2 includes a plurality of raster output scanners (ROSs) 22, 28, 34, 40, 46 located along the closed path 4p of the photoreceptor 4, which are individually operable to generate a latent mage on a portion of the photoreceptor 4 based on a clock input. In addition, a plurality of developers 24, 30, 36, 42, 48 are individually located downstream of a corresponding one of the ROSs 22, 28, 34, 40, 46 to develop toner of a given color on the latent image on the photoreceptor 4.

A transfer station 50 is located along the path 4p downstream of the ROSs 22, 28, 34, 40, 46 and operates to transfer the developed toner from the photoreceptor 4 to a substrate 52 traveling along a first substrate path P1, and a fusing station 58 with rollers 62 and 64 fixes or renders the transferred toner to the substrate 52. For two-sided printing, a duplex router 82 receives the substrate 52 from the fusing station 58 and selectively directs the substrate 52 along a second path P2, and a media inverter 84 located along the second path inverts the substrate 52 and returns the inverted substrate 52 to the first path P1 upstream of the transfer station 50 for selectively producing images on the second sides of certain substrate sheets.

The system 2 also includes a first clock 101 providing a first clock output signal 101a to the ROSs 22, 28, 34, 40, 46, as well as a second clock 102 providing a second clock output signal 102a to the ROSs 22, 28, 34, 40, 46, where the second clock output signal 102a is (or represents) a higher frequency than the first clock output signal 101a. In this regard, the clock output signals 101a 102a can be analog values or digital values indicating two different frequencies or clock speeds or other signals or values by which the ROS MPA operational speed can be set or adjusted. The clocks 101 and 102 may be separate devices or may be implemented as a single device generating or creating different clock output signals 101a, 102a as described herein, where one or both the clock speeds can be adjusted, either dynamically using a controller 100 during operation, or which can be preset, for example, during system calibration or initial manufacturing.

A controller 100 is coupled with the ROSs 22, 28, 34, 40, 46 and selectively operates a given ROS according to the first clock signal 101a or the second clock signal 102a, for instance, by providing a control signal or command to the individual ROSs 22, 28, 34, 40, 46 based on image data to be provided thereto. In general, the controller 100 directs a given ROS 22, 28, 34, 40, 46 to use the first clock signal 101 a if a latent image being generated by the given ROS is to be rendered on a first side of the substrate 52 or according to the second clock signal 102a if the latent image being generated by the given ROS is to be rendered on a second side of the substrate 52. The system 2 further includes an electronic registration adjustment component 210, which may be implemented in hardware, processor-executed software, firmware, logic, etc., and may be implemented as part of a digital front end (DFE) processing apparatus 200 of the system 200 used to process image data in an image data stream of the system 2. The electronic registration adjustment component 210 is operatively coupled with the controller 100 and in certain embodiments includes a CHIPER component 212 that selectively adds or removes at least one sub-pixel scan line to or from the image data associated with a given image. For removal of one or more sub-pixels, moreover, the adjustment component 210 may include a data memory or buffer 214 to store portions of image data to implement removal of select sub-pixels for mitigating IOP misregistration as described herein.

Figure 3:
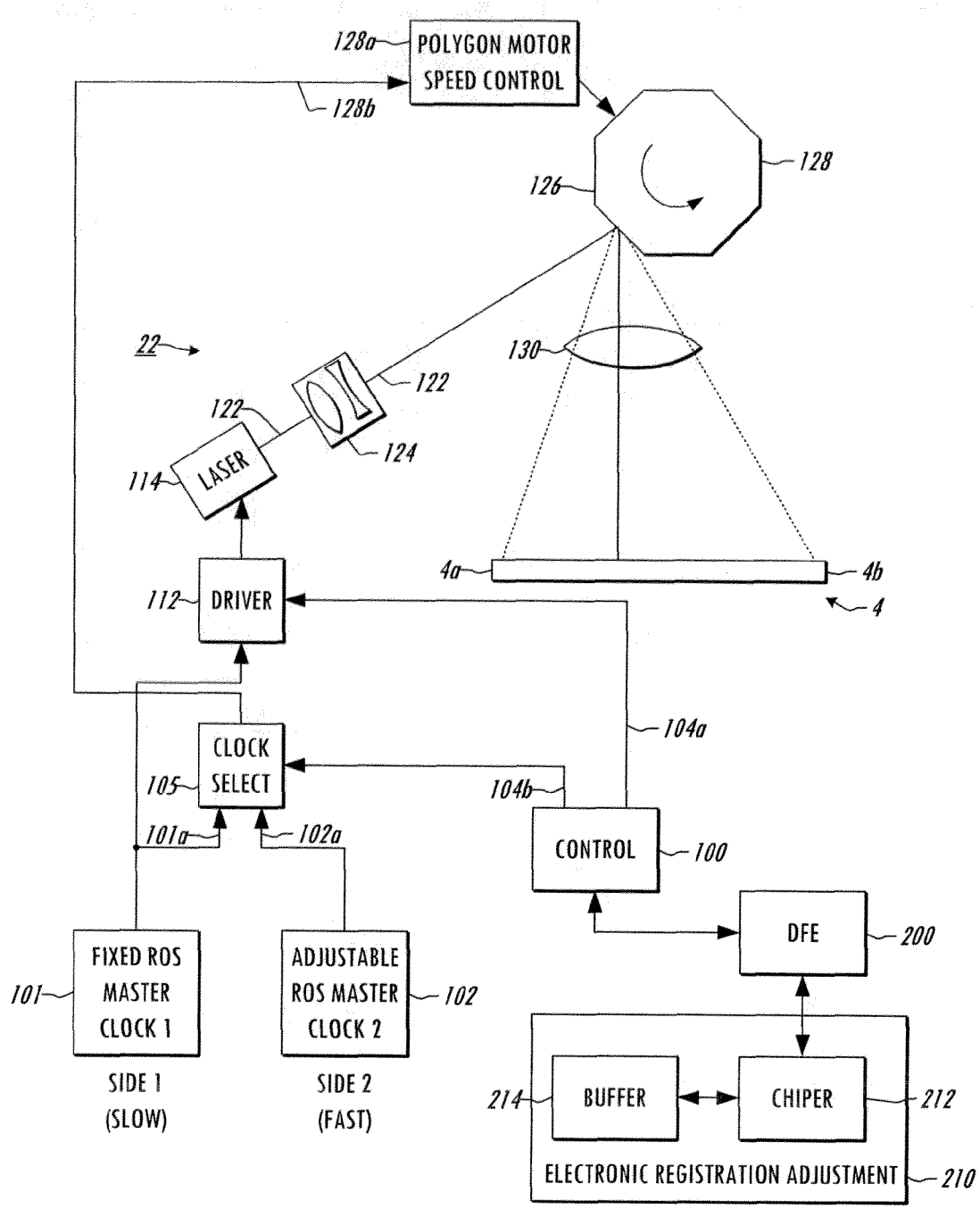
FIG. 3 is a simplified schematic diagram illustrating an exemplary multi-speed ROS and apparatus for electronic image data adjustment in accordance with various aspects of the disclosure.

Beginning on the right side in FIG. 1, the ITB photoreceptor 4 passes through a first charging station 10 that includes a charging device such as a corona generator 20 that charges the exterior surface of the belt 4 to a relatively high, and substantially uniform potential. The charged portion of the belt 4 advances to a first raster output scanner (ROS) type exposure device 22 which image-wise illuminates the charged belt surface to generate a first electrostatic latent image thereon, where FIG. 3 schematically illustrates further details of the exemplary first ROS device 22 as representative of the other ROSs in the system 2. The first electrostatic latent image is developed at a development station by developer unit 24 that deposits charged toner particles of a selected first color on the first electrostatic latent image.

Once the toner image has been developed, the photoreceptor belt 4 advances to a recharging station 12 that recharges the belt surface, and a second ROS 28 image-wise illuminates the charged portion of the belt 4 selectively to generate a second electrostatic latent image corresponding to the regions to be developed with toner particles of a second color. The second latent image then advances to a subsequent developer unit 30 that deposits the second color toner on the latent image to form a colored toner powder image of that color on the belt 4. The belt 4 then continues along the path 4p to a third image generating station 14 that includes a charging device 32 to recharge the belt 4 and a ROS exposure device 34 which illuminates the charged portion to generate a third latent image. The belt 4 proceeds to the corresponding third developer unit 36 which deposits toner particles of a corresponding third color on the belt 4 to develop a toner powder image, after which the belt 4 continues on to a fourth image station 16. The fourth station 16 includes a charging device 38 and a ROS exposure device 40 at which the belt 4 is again recharged and a fourth latent image is generated, respectively, and the belt 4 advances to the corresponding fourth developer unit 42 which deposits toner of a fourth color on the fourth latent image. The belt 4 then proceeds to a fifth station 18 that includes a charging device 44 and a ROS 46, followed by a fifth developer 48 for recharging, generation of a fifth latent image, and development thereof with toner of a fifth color.

Thereafter, the photoconductive belt 4 advances the multi-color toner powder image to the transfer station 50 at which a printable medium or substrate, such as paper sheet 52 in one example is advanced from a stack or other supply via suitable sheet feeders (not shown) and is guided along a first substrate media path P1. A corona device 54 sprays ions onto the back side of the substrate 52 that attracts the developed multi-color toner image away from the belt 4 and toward the top side of the substrate 52, with a stripping axis roller 60 contacting the interior belt surface and providing a sharp bend such that the beam strength of the advancing substrate 52 strips from the belt 4. A vacuum transport or other suitable transport mechanism (not shown) then moves the substrate 52 along the first media path P1 toward the fusing station (fuser) 58. The fusing station 58 includes a heated fuser roller 64 and a back-up roller 62 that is resiliently urged into engagement with the fuser roller 64 to form a nip through which the substrate 52 passes. In the fusing operation at the station 58, the toner particles coalesce with one another and bond to the substrate to affix a multi-color image onto the upper (first) side thereof.

While the multi-color developed image has been disclosed as being transferred from the photoreceptor belt 4 to the substrate 52, in other possible embodiments, the toner may be transferred to an intermediate member, such as another belt or a drum, and then subsequently transferred and fused to the substrate 52. Moreover, while toner powder images and toner particles have been disclosed herein, one skilled in the art will appreciate that a liquid developer material employing toner particles in a liquid carrier may also be used, and that other forms of marking materials may be employed, wherein all such alternate embodiments are contemplated as falling within the scope of the present disclosure.

For single-side printing, the fused substrate 52 continues on the first path P1 to be discharged to a finishing station (not shown) where the sheets are compiled and formed into sets which may be bound to one another and can then be advanced to a catch tray for subsequent removal therefrom by an operator of the document processing system 2.

For two-sided printing, the system 2 includes a duplex router 82 that selectively diverts the printed substrate medium 52 along a second (e.g., duplex bypass) path P2 to a media inverter 84 in which the substrate 52 is physically inverted such that a second side of the substrate 52 is presented for transfer of marking material in the transfer station 50. In this type of system using a heated fuser 58, the heat introduced into the substrate 52 by the fusing station 58 may cause the substrate 52 to shrink, and if two-sided printing is performed, the duplex router diversion to the second path P2 and media inversion in the apparatus 84 may return the inverted substrate 52 to the transfer station 50 before the substrate 52 can be again acclimated to the ambient temperature, whereby the image is transferred to the second side of the substrate 52 before the substrate 52 returns to its original size, and process magnification error results.

In order to combat this, the system 2 employs the first clock 101 providing the first clock output signal 101a along with the second clock 102 providing the second clock output signal 102a to the ROSs 22, 28, 34, 40, and 46, with the controller 100 selectively operating a given ROS according to the first clock signal 101a if the latent image being generated by the given ROS is to be fixed to a first side of the substrate 52 or alternatively according to the second clock signal 102a if the latent image being generated by the given ROS is to be fixed to a second side of the substrate 52. The controller 100 may be any suitable form of hardware, processor-executed software, firmware, programmable logic, or combinations thereof, whether unitary or implemented in distributed fashion in a plurality of components, wherein all such implementations are contemplated as falling within the scope of the present disclosure and the appended claims.

The first and second clocks 101 and 102 may directly couple their output signals 101a and 102a to the individual ROSs 22, 28, 34, 40, and 46 or local ROS interface modules (RIMs) thereof as shown, or alternatively, the clocks 101 and/or 102 can be connected indirectly to the ROSs 22, 28, 34, 40, and 46 via one or more intervening components such as the controller 100, or the controller 100 may include one or both of the clocks 101, 102, wherein all such variant implementations as contemplated as falling within the scope of the present disclosure. In certain implementations, the second clock 102 can be configured to generate an adjustable RMC signal 102a used to source a square wave digital clock signal that is, in turn, used as an adjustable ROS master clock (RMC), where the frequency of the signal 102a is controlled by the controller 100, which sends a parameter value via control signal(s) 103 to the second clock 102 control inputs, which, in turn, sets the desired numerically controlled oscillator (NCO) output frequency 102a, the details of such implementation are described in U.S. patent application Ser. No. 12/645,603, filed Dec. 23, 2009 and assigned to the assignee of the present disclosure, incorporated herein by reference.

The second clock 102, moreover, is preferably adjustable to allow for calibration of the second clock speed to counteract the amount of shrinkage-related side 1 to side 2 process magnification error in a given document processing system 2. In particular, the illustrated embodiments provide for adjustment of the second clock 102 such that a frequency ratio of the first and second clocks 101, 102 corresponds to a side 1 to side 2 process magnification for the system 2, for instance, as measured during setup using the first clock 101, where the side 1 to side 2 process magnification is quantified as the ratio of the side 1 image size divided by the side 2 image size using clock 1 to perform two-sided printing of the same image data size to both sides of a substrate 52.

Referring also to FIG. 2, the photoreceptor belt 4 includes multiple image panel zones 102 in which the ROSs 22, 28, 34, 40, and 46 generate latent images, where three exemplary panel zones 106a, 106b, and 106c are illustrated in the partial view of the figure. Any number of panels 106 may be defined along the circuitous length of the photoreceptor 4, and the number may change dynamically based on the size of the printed substrates 52 being fed to the transfer mechanism 50, where the illustrated belt 4 includes about 11 such zones 106 for letter size paper sheet substrates 52. The panel zones 106 are separated from one another by inter panel zones IPZ, where two exemplary inter-panel zones IPZ1 and IPZ2 are shown in FIG. 2, with IPZ1 being defined in a portion of the belt 4 that includes a belt seam 4s.

Referring also to FIG. 3, the controller 100 provides the individual ROSs 22, 28, 34, 40, and 46 with one or more control signals or values via connections 104, including a control parameter associated with each upcoming image panel zone 106 to indicate whether a latent image to be generated on the upcoming panel zone 106 is ultimately destined to be fixed or rendered to the first side or to the second side of the substrate 52. Based on this control parameter, the ROSs 22, 28, 34, 40, and 46 individually select one of the clock output signals 101a, 102a for use in generating a latent image on the upcoming panel zone 106. FIG. 3 shows further details of the first ROS 22, wherein the other ROSs 28, 34, 40, and 46 in the exemplary system 2 are similarly constructed. The ROS system 22 includes a data input 104a from the controller 100 to a driver 112 of a diode laser 114 (which can be an array of lasers or other light sources), as well as a clock select parameter input 104b from the controller 100 to a clock select component 105 for selecting between first and second clock inputs 101a and 102a from the first and second clocks 101 and 102, respectively. The clock select component 105 selectively couples the output of one of the clocks 101, 102 to a selected clock input connection 128b that is operatively coupled to the clock input of a polygon motor speed control 128a of the ROS MPA.

In operation, a stream of image data is provided via the controller 100 to the driver 112 associated with a single color portion of the next panel zone image, and the driver 112 modulates one or more of the diode lasers 114 to produce a modulated light output 122 in conformance with the input image data. The laser beam light output 122 passes into conditioning optics 124 and then illuminates a facet 126 of a rotating polygon 128 having a number of such facets 126 (eight in one example). The light 122 is reflected from the facet 126 through a lens 130 to form a spot on the photosensitive image plane of the passing photoreceptor belt 4. The rotation of the facet 126 causes the spot to sweep across the image plane forming a succession of scan lines oriented in a "fast scan" direction (e.g., generally perpendicular to a "slow scan" or process direction 4p along which the belt 4 travels). Movement of the belt 4 in the slow scan direction 4p is such that successive rotating facets 126 of the polygon 128 form successive scan lines (or groups thereof) that are offset from each other (and from preceding and succeeding groups) in the slow scan direction. Each such scan line in this example consists of a row of pixels produced by the modulation of the laser beam 122 as the laser spot scans across the image plane, where the spot is either illuminated or not at various points as the beam scans across the scan line so as to selectively illuminate or refrain from illuminating individual locations on the belt 4 in accordance with the input image data.

In the illustrated example, the ROS system 22 includes the driver 112 and clock select component 105 which together constitute a ROS interface module (RIM) that receives the first and second clock signals 101a, 102a from the clocks 101 and 102, respectively, and the controller 100 provides the parameter 104b to the RIM in order to indicate to the RIM whether the upcoming panel image is destined for side 1 or side 2 on the final printed substrate 52. This parameter allows the RIM of a given ROS to determine whether or not to switch clocks, and this selective employment of the faster second clock 102 facilitates adaptation of side 2 images to the pre-shrunk substrate 52 resulting from the duplex routing and inversion following the high temperature fusing in two-sided printing in the document processing system 2. In this regard, the speed of the ROS motor polygon assembly (MPA) 128, along with the speed of the photoreceptor belt 4 determine the overall process magnification of the latent image on the belt, where the belt speed is held substantially constant in the system 2, and the process magnification error is susceptible to substrate size variation resulting from thermal shrinking in the fuser 58 absent the selective dual speed MPA operation of the present disclosure.

It is noted that since there may be multiple panels 106 having images for different substrate sides at any given time, the speed of the belt 4 cannot be changed to address the side 1 to side 2 process magnification errors caused by substrate shrinkage in the fuser 58. Moreover, there are typically more than one ROS generating latent images concurrently, and thus simply changing the speed of a single ROS clock (or the belt speed) does not provide a solution, since the concurrently generated latent images may be destined for both side 1 and side 2 of the substrate 52 at any given time. Moreover, as the belt speed is increased for advanced higher speed printing, adaptation of the MPA polygon motor speed to change between first and second ROS clock frequencies may result in situations where the settling time of an MPA speed change continues past an IPZ of the photoreceptor belt 4, which can cause image distortion, IQ errors, etc., particularly for the latent image generated in the first panel image zone 106 following a ROS clock speed change.

Thus, while these effects may be compensated to a certain extent by use of dual clock speeds for relatively low belt speeds, physical limitations on the ability to speed up and slow down the MPA polygon rotational speed make such a solution less than complete, particularly for faster belt speeds. To address this problem, the inventors contemplate the use of different ROS scanning speeds for generating latent images on the photoreceptor 4 for images destined for different sides of a printed substrate, along with selective use of electronic registration processing in the component 210 (FIGS. 1 and 3) to add or remove pixels or sub-pixels in leading portions of images for the first panel following a scanning speed change. In particular, addition or removal of pixel or sub-pixel scan line data in the slow-scan direction can be employed to counteract overshoot or undershoot in the MPA operating speed after clock speed changes implemented by the clock selection component 105. In addition to this compensatory use of CHIPER or other electronic registration adjustment, the electronic registration processor 210 can be employed in generally continuous fashion in combination with adjusting the ROS MPA speeds to effectively extend the ranges of the two individual approaches in combating IOP registration problems, particularly at high operating speeds.

In the illustrated system 2, the controller 100 uses information regarding the ultimate destination of a given image (side 1 or side 2 of the final printed media 52) to perform both clock selection and for selective addition or removal of data sub-pixels to or from the corresponding image data to provide control over IOP misregistration, and these techniques can be used for situations in which paper shrinkage or enlargement causes the underlying registration errors. In particular implementations, selective sub-pixel addition, removal, or both are employed to counteract MPA speed overshoot or undershoot based on whether the speed is increasing or decreasing, and this compensatory use of electronic registration adjustment can be selectively done for dynamically adjusted or pre-determined leading portions of images generated in the initial ITB panel zone following a ROS speed change. This control over the duration of the selective data modification can account for speed transitions extending beyond an inter-document zone (IDZ) or inter-panel zone (IPZ). In addition, the electronic registration adjustment component 210 can be configured to adjust the amount of addition or removal based on a specific measured (or estimated) speed overshoot/undershoot profile to more carefully counteract specific image distortion in the determined leading portions of images generated in the initial ITB panel zone following a ROS speed change, where the durations, amounts, and/or adjustment profiles can be separately tailored for speed up and slow down changes.

Moreover, the systems and methods disclosed herein can alternatively or in combination provide continuous electronic registration adjustment, such as by CHIPER techniques as exemplified in U.S. Patent Application Publication No. 2010/0309526, published Dec. 9, 2010 and filed as Ser. No. 12/480,945 on Jun. 9, 2009 (assigned to the assignee of the present disclosure), incorporated herein by reference to combat IQ errors and IOP misregistration errors resulting from print media shrinkage/stretching by selectively adding and/or removing one or more sub-pixels to/from the image data prior to printing.

Figure 4:
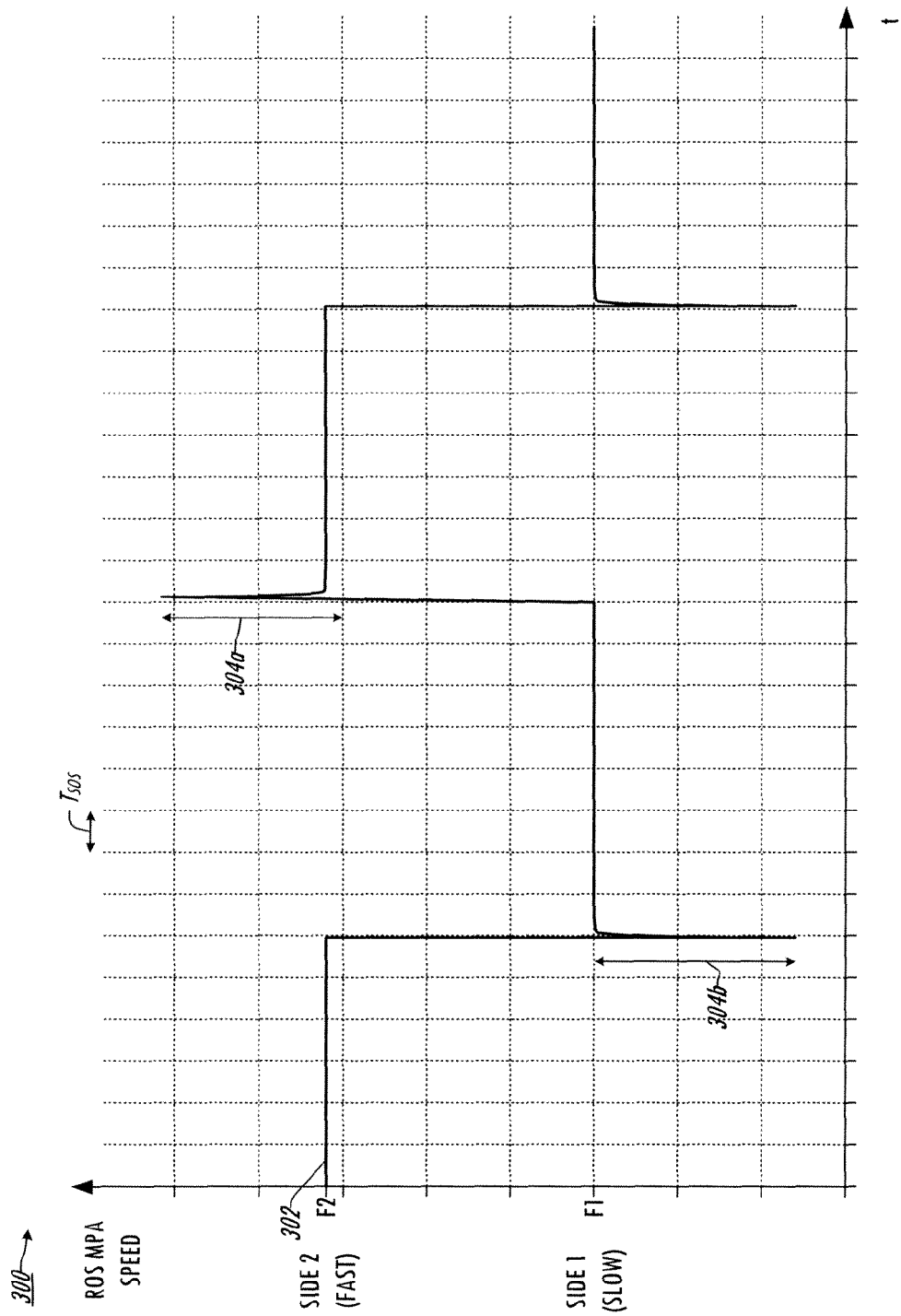
FIG. 4 is a graph showing an exemplary ROS MPA speed curve for operation at two different speeds.
Figure 5:
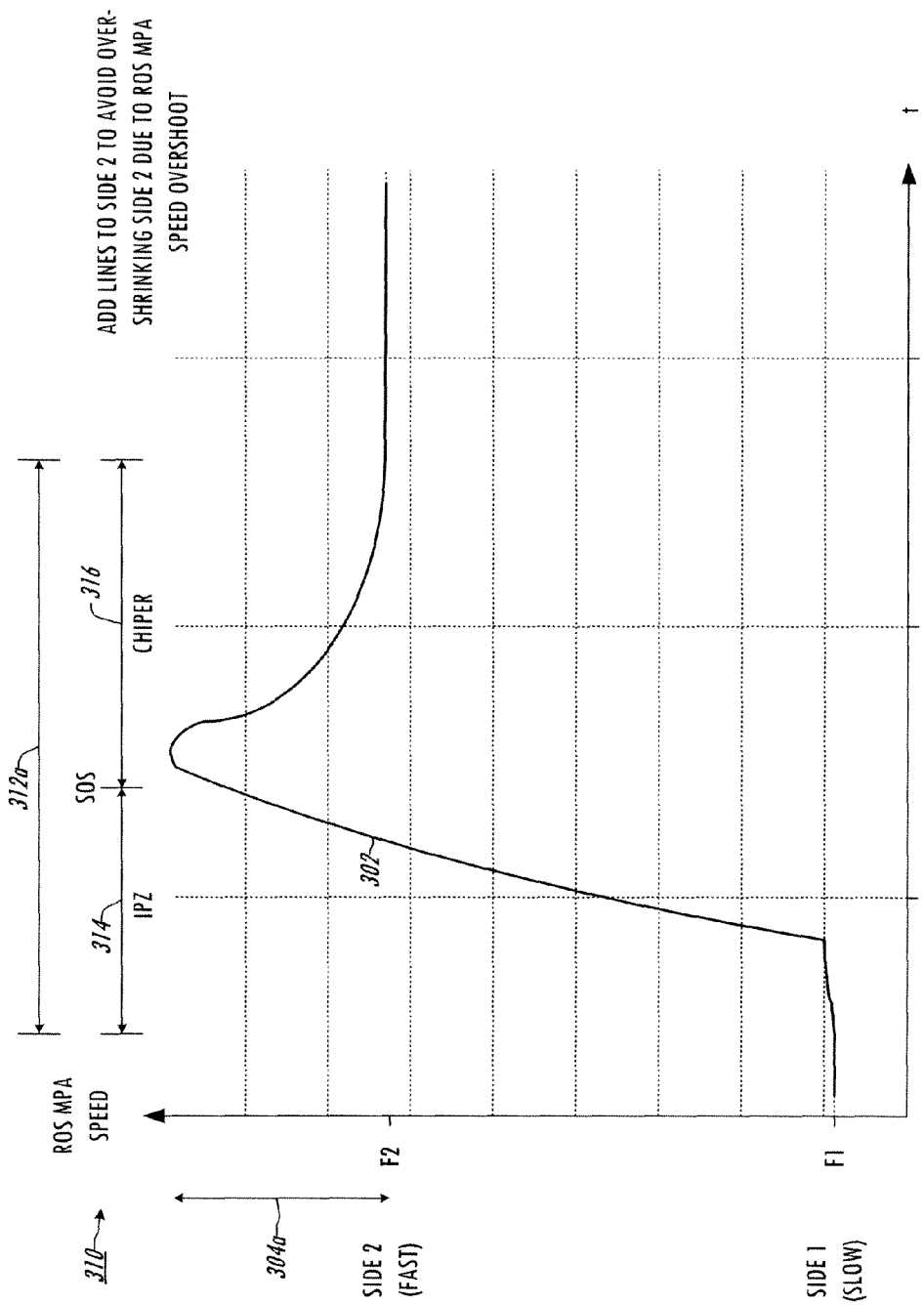
FIG. 5 is a graph showing further details of a ROS MPA speed overshoot during transition from a first speed to a second speed in the graph of FIG. 4.
Figure 6:
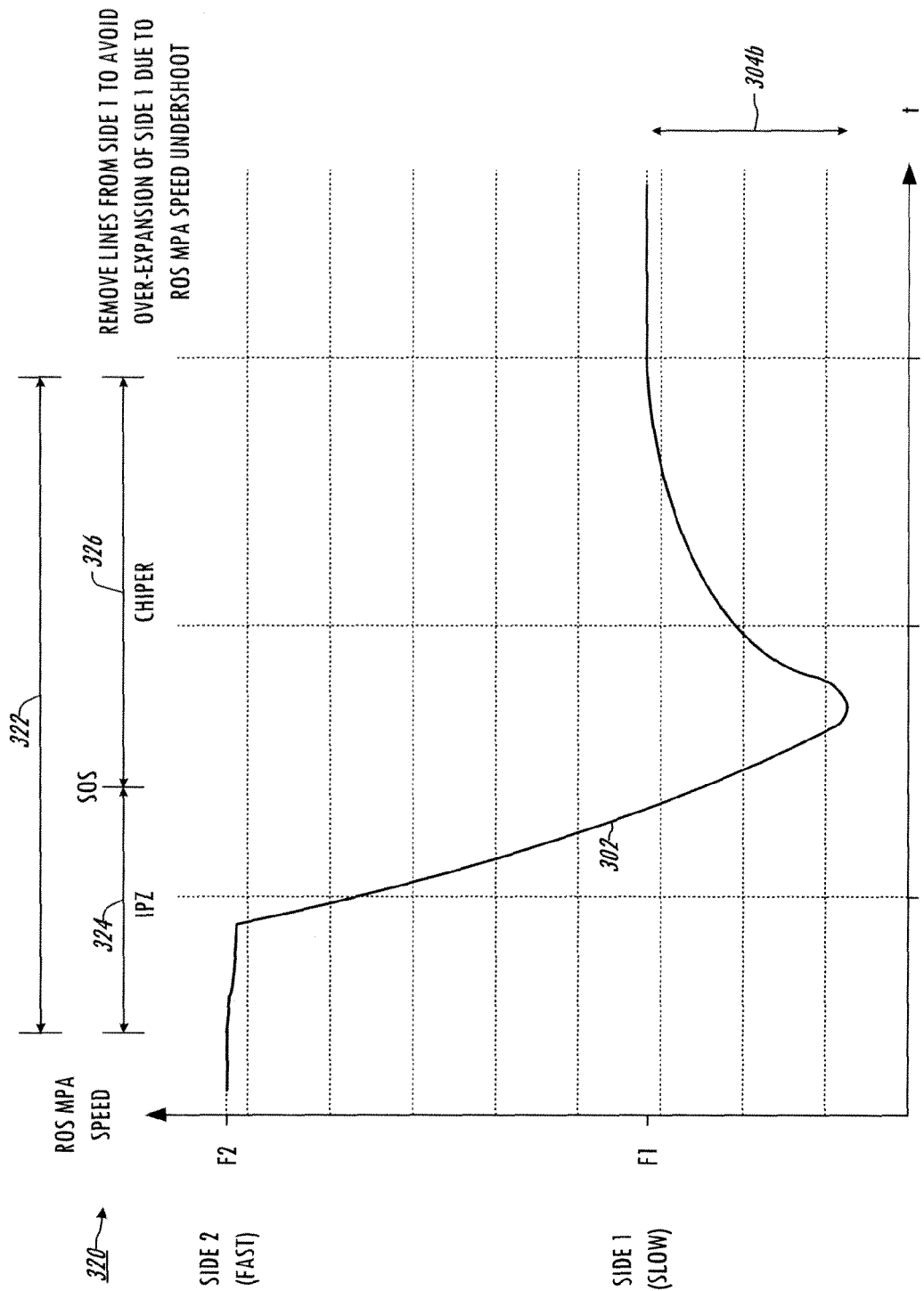
FIG. 6 is a graph illustrating a ROS MPA speed undershoot during transition from the second speed to a slower first speed in the graph of FIG. 4.

Referring also to the graphs 300, 310, and 320 in FIGS. 4-6, respectively, the system controller 100 employs two separate clocks 101 and 102, with the higher speed second clock 102 being used by the ROSs while generating latent images destined for side 2 of the substrate 52 for situations in which the fuser 58 shrinks the sheet media 52 prior to side 2 printing (the converse situation can be implemented to combat media stretching between printing the first and second sides). The transition between clock signals 101a and 102a in the illustrated embodiment is preferably initiated during the time when an IPZ is traveling past the ROS, with each ROS being selectively adapted to the appropriate clock 101, 102 independently as the belt 4 continues at a generally constant controlled speed. In the system 2, moreover, the image data synchronization is maintained by providing the first clock signal 101a to the driver 112. Once a ROS has switched to the second clock 102 for driving the MPA 128, the ROS operates to rephase the MPA 128 when a sync signal is received from the first clock 101.

The graph 300 of FIG. 4 illustrates an exemplary ROS MPA speed curve 302 for operation at two different ROS MPA speeds, F1 corresponding to a nominal fixed frequency clock output 101a from the first clock 101, and F2 representing the second speed MPA set by the output 102a of the second (e.g., adjustable) ROS master clock 102. This example shows operation through multiple start of scan (SOS) periods $T_{SOS}$ with the controller 100 switching the selection of clock signals for a given ROS (e.g., the first system ROS 22 of FIG. 3 above) at certain times based on the media side (side 1 or side 2) for which the next (current) panel zone image data is ultimately destined.

Referring also to FIG. 5, in practice, switching from the first clock speed (F1) 101a to the second clock speed (F2) 102a results in the polygon motor speed control 128a (FIG. 3) accelerating the rotation of the motor driving the polygon 128. To accommodate the brief time corresponding to the IPZs of the photoreceptor belt 4, this acceleration is preferably fast, leading to a certain amount of MPA speed overshoot 304a where the actual speed of the MPA exceeds the desired speed set by signal 102a. As best seen in FIG. 5, moreover, this overshoot results from a speed change initiated at the beginning of an IPZ period 314, but the overshoot duration 312a lasts beyond the end of the IPZ period 314, whereby the MPA speed 302 does not reach the final steady state value F1 for another time period 316 (CHIPER period in FIG. 5) following the start of scan (SOS) for the next image zone 106 of the photoreceptor 4. The controller 100 in certain embodiments employs selective addition of one or more sub-pixels to the image data to counteract the overshoot. In certain embodiments, the chipper component 214 of the electronic registration adjustment system 210 sets the amount of sub-pixel addition in this period 316 according to a measured or estimated or otherwise predetermined profile, preferably corresponding to the actual MPA speed overshoot for clock 1 to clock 2 transitions in the system 2. In addition, the chipper component 212 preferably implements selective sub-pixel addition during the period 316 at the leading edge of the image data for the panel 106 following such a speed change, where the duration of the pixel-addition can be based on measured, estimated, or otherwise pre-determined overshoot settling time for MPA speedup transitions.

As seen in the graph 320 of FIG. 6, moreover, a similar situation exists for transitions from the second speed (F2) 102a to the lower first speed (F1) 101a in the curve 302. In this case, the command from the controller 100 to change clock selection from the second clock 102 to the first clock 101 causes the MPA to slow down with undershoot past (slower than) the first speed F2 by an amount 304b, with the undershoot profile in this case beginning at the start of the IPZ period 324 and continuing past the SOS of the next panel zone 106 for an overall duration 322 that includes a portion 326 that extends well into the leading portion of the image panel period. For data corresponding to this CHIPER portion 326, the chipper component 212 selectively removes one or more sub-pixels from the image data for the next photoreceptor panel zone portion 106 of the photoreceptor 4. In doing this data removal, the chipper component 212 may operate on image data portions stored in a dedicated chipper buffer 214 as shown in FIGS. 1 and 3, which is part of the image data path in the system 2, where the controller 100 may employ the electronic registration adjustment component 210 in conjunction with the DFE 200 for controlled management of the image data flow in the system 2.

The selective data sub-pixel addition and/or removal can be done in a manner that accommodates single laser scanning ROS architectures, as well as those using an array (e.g., 32) light sources 114, where the addition/removal can be implemented using any suitable logic or algorithms so as to provide minimal artifact distortion in the ultimately printed images (e.g., intelligent sub-pixel selection for addition or removal based in whole or in part on the nature or character of the printed subject matter represented by the data, such as text characters, etc.).

The controller 100 thus implements selective ROS master clock speed adjustment based at least partially on the print side (side 1 or side 2) to combat IOP misregistration, and the electronic registration adjustment component 210 compensates for speed adjustment overshoot 403a and/or undershoot 304b by selectively adding or removing at least one sub-pixel to or from image data associated with a given image to be printed in the next panel 106 following a speed change command from the controller 100. In certain embodiments, moreover, the electronic registration adjustment component 210 selectively adds or removes sub-pixels only if the given image is a first image generated using one of the clock signals 101a, 102a following generation of an immediately preceding image generated using the other clock signal. In addition, the electronic registration adjustment component 210 in certain embodiments selectively adds or removes at least one sub-pixel to or from only an initial portion of the image data associated with the given image, ideally corresponding to measured or actual MPA speed overshoot or undershoot durations 316 and 326 in FIGS. 5 and 6, respectively, which extend past the SOS for that image. Furthermore, the initial portion of the image data associated with the given image for which data adjustment is performed may be adjustable, or may be predetermined in certain embodiments.

The electronic registration adjustment component 210 may also implement selective data sub-pixel addition and/or removal in non-speed change situations, again based at least in part on the final printed media side (side 1 or side 2) for which the panel image data is destined (again with the ROS master clock speed set by the controller 100 according to the side information. In certain embodiments, the adjustment component 210 selectively add one or more sub-pixels to the image data associated with the given image if the given image is generated using the first clock signal 101a. It is noted that this is different than the compensatory use of the adjustment component 210 to counteract overshoot (in that case, the adjustment was by sub-pixel removal for data scanned at the first clock speed 101a). In certain embodiments, moreover, the adjustment component 210 may selectively remove at least one sub-pixel if the given image is generated using the second clock signal 102a (e.g., via the buffer 214 and the chipper component 212 in one example).

Figure 7:
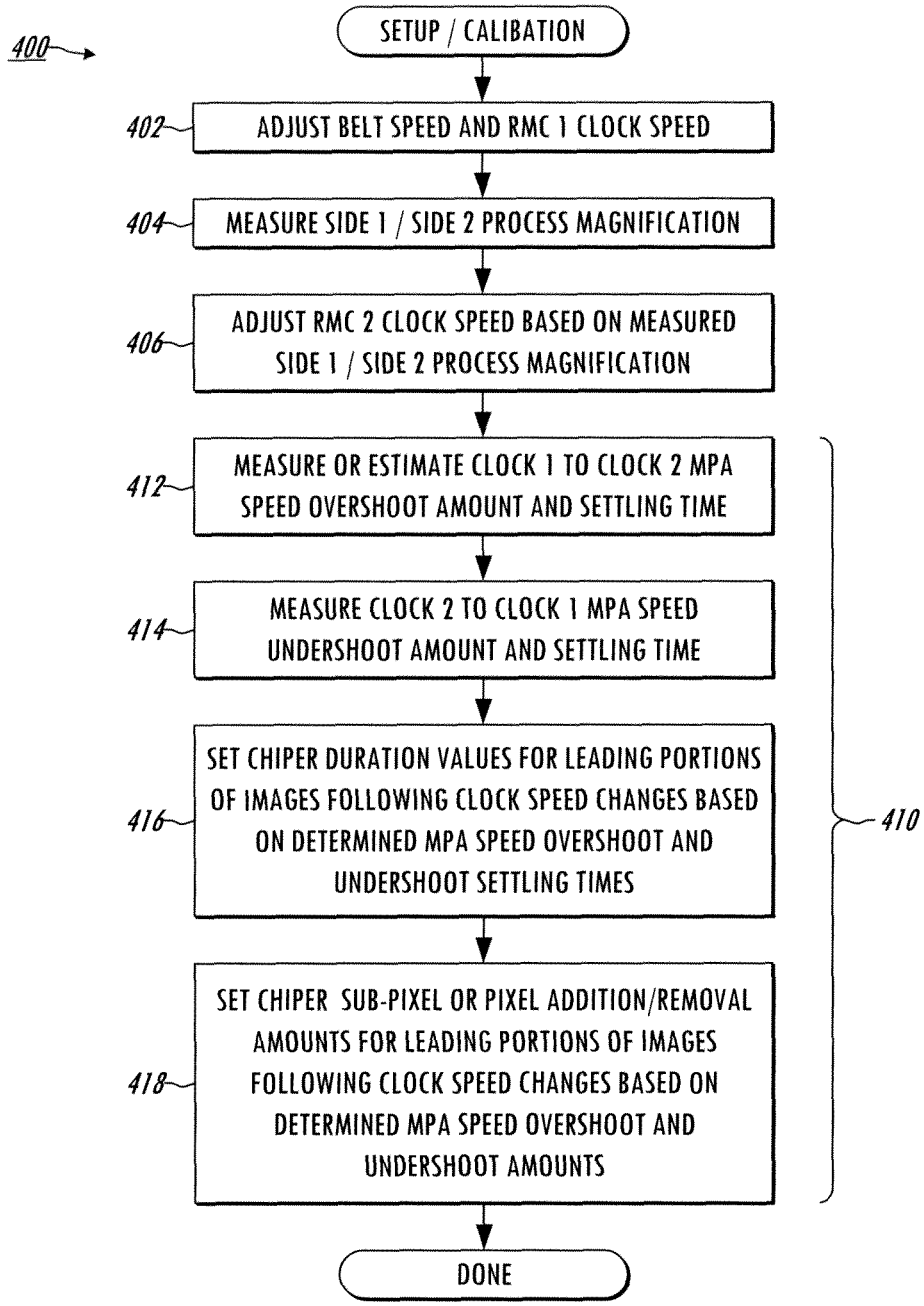
FIG. 7 is a flow diagram illustrating an exemplary setup process for determining first and second ROS MPA clock speeds and for determining CHIPER sub-pixel addition or removal amounts in the document processing system of FIG. 1.

Referring now to FIG. 7, the amount, duration, and profile of added or removed sub-pixel to or from the image data may be determined during calibration of the system 2, and such may be thereafter updated, or may be adjusted in real-time by measurement of actual MPA speed change response characteristics during system operation. FIG. 7 illustrates an exemplary setup process for determining first and second ROS MPA clock speeds and for determining CHIPER sub-pixel addition or removal amounts and duration in the document processing system of FIG. 1. In certain embodiments, the second clock 102 is adjustable, and its frequency is set relative to that of the first clock 101 to counteract a measured process magnification error performed using the first clock 101 during setup or calibration of the system 2. FIG. 7 illustrates an exemplary setup process 400 in which the speed of the belt 4 and the first ROS master clock (RMC) 101 may be adjusted at 402. A side 1 to side 2 process magnification is then measured at 404. The measurement at 404 can be any suitable show-thru error measurement in which images are printed onto two sides of a single substrate, preferably by printing the same image data on both sides, such that the process magnification error attributable to fuser shrinkage of the substrate 52 can be quantified. In one embodiment, the process magnification error is characterized at 404 as the side 1 image size divided by the side 2 image size for images printed using image data representing the same image size, to yield a unitless error ratio.

At 406, the speed (e.g., frequency) of the second ROS master clock 102 (RMC 2) speed is adjusted based on the measured process magnification. In one implementation, the clock speed of the second clock 102 is adjusted at 406 such that the frequency ratio of the first and second clocks 101, 102 corresponds to the side 1 to side 2 process magnification for the system 2 measured using the first clock. Thus, for example, a 2% measured process magnification error would yield a side 2 image that is 2% larger than that of side 1, and the second clock 102 would be adjusted at 206 to be 2% faster than the first clock 101. At 410, the MPA speed change performance is measured. At 412, the clock 1 to clock 2 speed overshoot amount (304a in FIG. 5) and the settling time (time 312a in FIG. 5) are measured, and the clock 2 to clock 1 MPA speed undershoot amount and settling time are measured at 414 (e.g., undershoot amount 304b and settling time 322 in FIG. 6 above). The profiles of the MPA overshoot and/or undershoot can also be measured at 412 and 414 in certain embodiments. At 416, the chiper duration 316 in FIG. 5 is set for use in compensating leading portions of images following clock 1 to clock 2 speed changes, and at 418, a chiper duration (326 in FIG. 6) is set for compensating leading portions of images following clock 2 to clock 1 speed changes.

Figure 8:
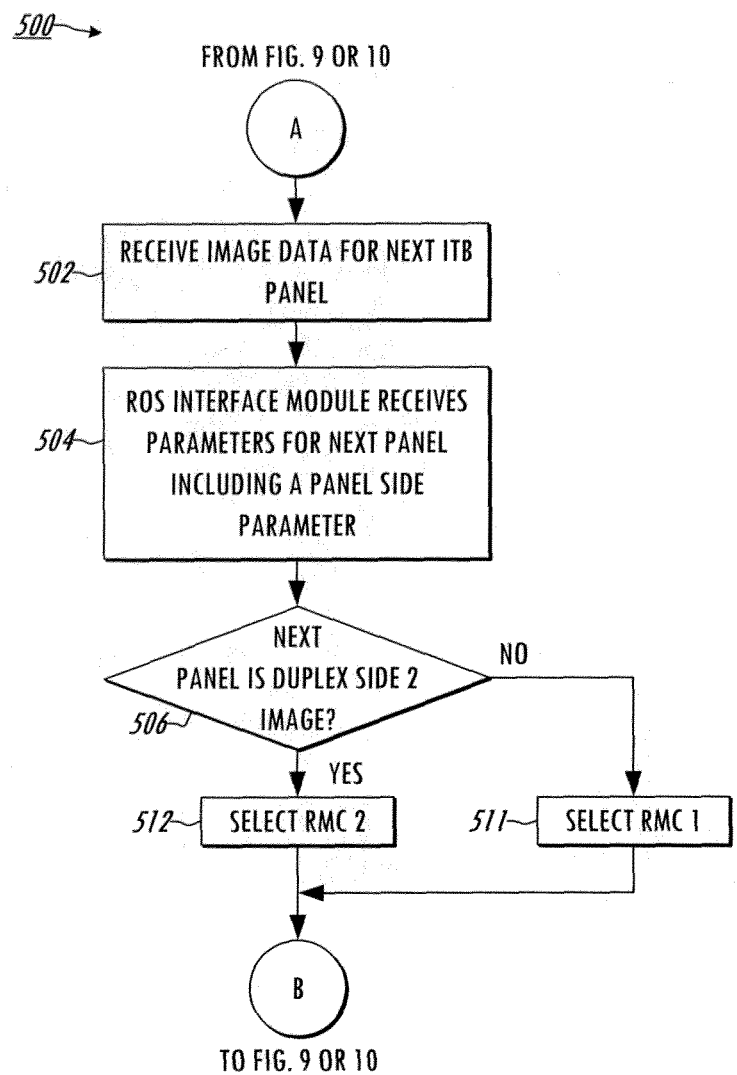
FIG. 8 is a flow diagram illustrating a ROS clock selection portion of an exemplary printing method in accordance with various aspects of the disclosure.
Figure 9:
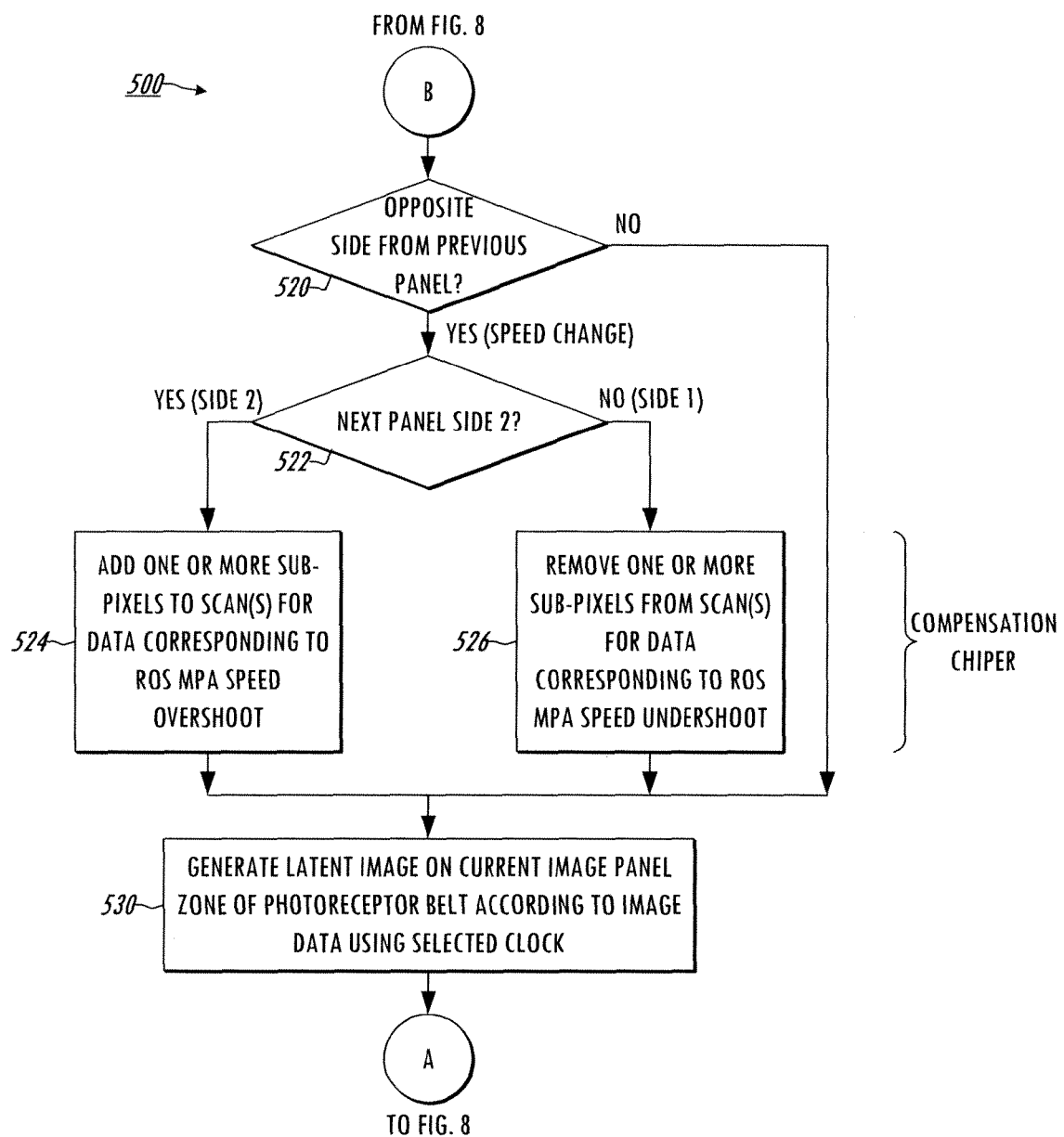
FIG. 9 is a flow diagram illustrating an embodiment of another portion of the printing method of FIG. 8 in which one or more sub-pixel scan lines are added or removed to or from image data in the process (slow-scan) direction to counteract overshoot or undershoot in the MPA operating speed.
Figure 10:
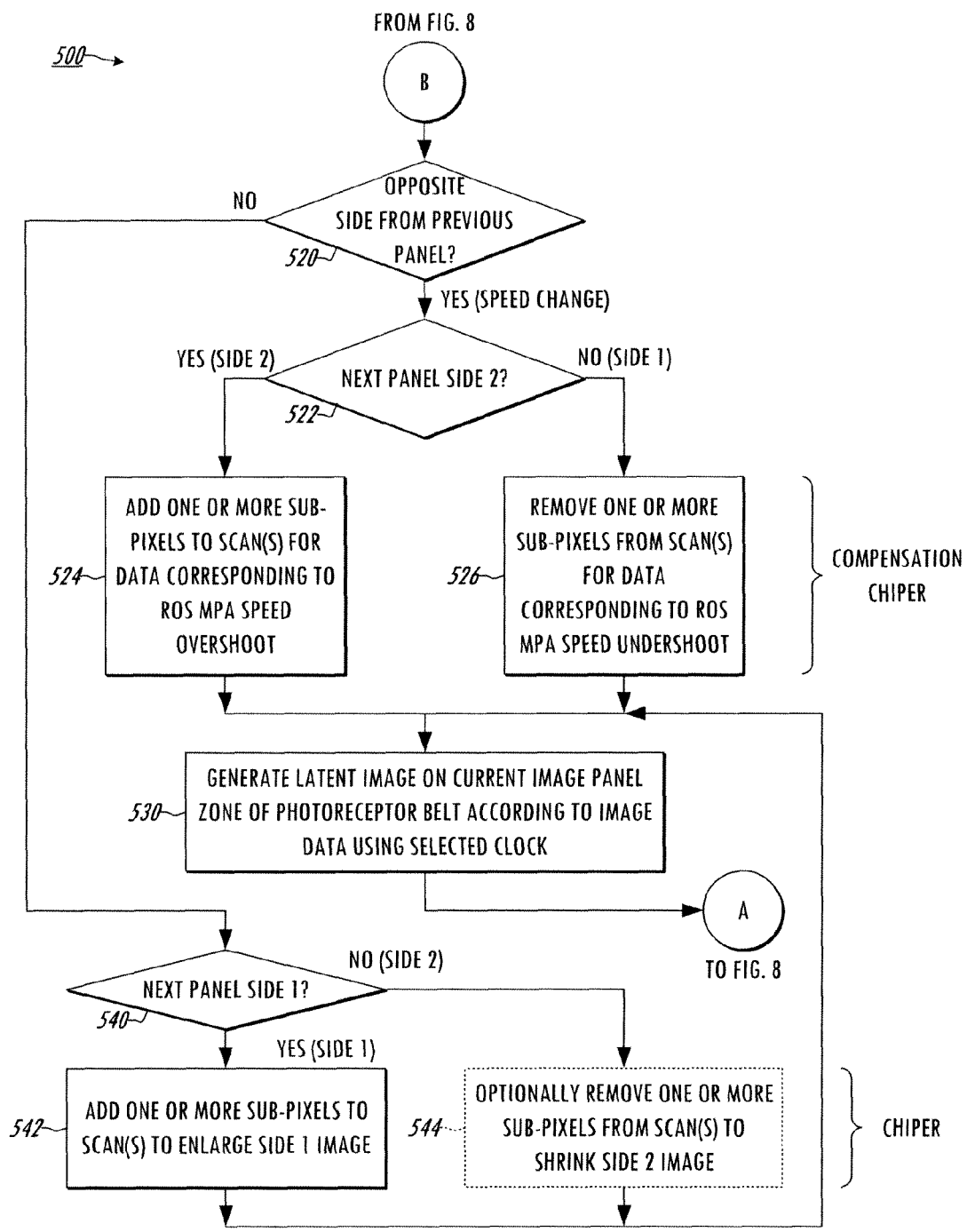
FIG. 10 is a flow diagram illustrating another embodiment of a portion of the printing method of FIG. 8 in which one or more sub-pixel scan lines are added or removed to or from image data in the slow-scan direction to counteract overshoot or undershoot in the MPA operating speed and sub-pixel addition and/or removal is also selectively used in non-speed-change situations to combat IOP misregistration in duplex printing in accordance with the disclosure.

Referring now to FIGS. 8-10, exemplary embodiments of a printing method 500 are illustrated. FIG. 8 illustrates a ROS clock selection portion of the method 500 in which the adjusted second clock 102 (and the preset first clock 101) are used in performing duplex printing in the system 2. At 502, print job page image data is received in the system 2, such as in the controller 100 (and data portions may be stored in the buffer 214 of the electronic registration adjustment system 210 in certain embodiments). This data can include latent image data for one or more colors (e.g., corresponding to the ROSs 22, 28, 34, 40, and 46 in FIG. 1), where each page data is ultimately destined for printing onto either side 1 or side 2 of the substrate 52. At 504, the controller 100 determines the side 1 or side 2 indication from the data and sends image control information to each of the ROSs 22, 28, 34, 40, and 46 relating to latent images to be generated in upcoming image panel zones 106 of the photoreceptor belt 4. The individual ROSs receive next image control parameters at 504 that include a panel side parameter indicating whether a latent image to be generated by a given ROS on an upcoming panel zone 106 is ultimately destined for rendering or fixing to a first side or a second side of the final print media substrate 52. The control parameter is preferably provided prior to the end of the IPZ preceding the upcoming panel zone 106. The RIM of each ROS determines at 506 whether the next image is for the second side, and if not (NO at 506), the first clock (RMC 1) 101 is selected at 511. Otherwise, if the next image is for side 2 (YES at 506), the second clock 502 is selected at 512. The ROS then uses the selected clock at 514 to generate the latent image in the current image panel zone 106 of the photoreceptor belt.

FIG. 9 illustrates an embodiment of another portion of the printing method 500 in which one or more sub-pixel scan lines are added or removed to or from image data in the slow-scan direction to counteract overshoot or undershoot in the MPA operating speed (compensation chiper). A determination is made at 520 as to whether the next panel image data is destined for the opposite final print media side relative to the preceding panel data. If not (NO at 520), the process proceeds to 530 where the data is used to generate a latent image in the current panel image zone (106 in FIG. 2) according to the image data and the clock selected at 511 or 512 in FIG. 8, and the process 500 returns to process the next panel image data at 502 in FIG. 8. If the next panel is for the opposite media side (YES at 520), a side 1 vs. side 2 determination is made at 522. If the next panel is for side 2 of the final print media 52 (YES at 522), the chiper component 212 (FIGS. 1 and 3 above) selectively adds one or more sub-pixels at 524 to the image data for the next photoreceptor panel zone portion. If instead the next panel data is for media side 1 (NO at 522), one or more sub-pixels are selectively removed at 526 from the image data for the next photoreceptor panel zone portion 106. Once the data adjustment has been done at 524 or 526 a latent image is generated at 530 on the next panel zone portion 106 of the photoreceptor 4 using the adjusted image data and the selected clock speed 101a, 102a, and the process 500 returns to process the next panel image data at 502 in FIG. 8. In this manner, the embodiment of FIG. 9 employs selective sub-pixel addition and/or removal to compensate for the ROS MPA speed overshoot or undershoot.

FIG. 10 is a flow diagram illustrating another embodiment of a portion of the printing method 500 continuing from FIG. 8 in which one or more sub-pixels are added or removed to or from image data in the slow-scan direction to counteract overshoot or undershoot in the MPA operating speed. In addition, this example uses sub-pixel addition and/or removal in non-speed-change situations to combat IOP misregistration in duplex printing in accordance with the disclosure. This further use of the chiper type electronic registration adjustment to the image data can be employed to effectively extend the registration adjustment range of a given system 2. This technique can also be used with scaled-back ROS master clock adjustment, for instance, where the ROS clock speed changes can be restricted to smaller changes to effectively reduce the amount and duration of overshoot/undershoot, with the remainder of the registration compensation being done electronically.

In the embodiment of FIG. 10 (like that of FIG. 9), the selective compensatory chiper electronic registration adjustment is performed at 522, 524, 526 as described above in situations where the next panel image data is destined for the opposite final print media side relative to the preceding panel data. In this case, however, if the next latent panel image is not to be generated after/during a clock speed change (NO at 520), the process proceeds to 540 in FIG. 10, where the data is used to generate a latent image in the current panel image zone (106 in FIG. 2) according to the image data and the clock selected at 511 or 512 in FIG. 8, and the process 500 returns to process the next panel image data at 502 in FIG. 8. If the next panel is for the opposite media side (YES at 520), a side 1 vs. side 2 determination is made at 522. If the next panel is for side 2 of the final print media 52 (YES at 522), the chiper component 212 (FIGS. 1 and 3 above) selectively adds one or more sub-pixels at 524 to the image data for the next photoreceptor panel zone portion.

If instead the next panel data is for media side 1 (NO at 522 in FIG. 10), one or more sub-pixels are selectively removed at 526 from the image data for the next photoreceptor panel zone portion 106, where this adjustment is in the opposite direction as the compensation chiper at 524, 526. For non-speed changing panels, the process 500 proceeds to 540 in FIG. 10, where a determination is made as to which side (side 1 or side 2) the panel image data is destined for on the final print media sheet 52. For side 1 (YES at 540), the adjustment component 210 selectively adds one or more sub-pixels to the image data at 542. Otherwise (NO at 544 for media side 2), the adjustment component 210 selectively removes one or more sub-pixels from the data at 544 (e.g., using the buffer 214 shown in FIGS. 1 and 3). Thereafter, the process proceeds to generate a latent image at 530 using the adjusted image data and the selected clock speed 101a, 102a, and the process 500 returns to process the next panel image data at 502 in FIG. 8. This combined technique can be employed with full electronic data adjustment (e.g., chiper), or in some embodiments uses only subpixel addition at 524 and/or 542, with the removal steps 526 and 544 being omitted.

In other embodiments, the compensation chiper steps 522, 524, and 526 are omitted in the example of FIG. 10, and the system 2 utilizes ROS master clock speed adjustment (e.g., FIG. 8) in combination with selective image data adjustment by sub-pixel addition or removal (at 542 and 544) depending on the media side determination (side 1 or side 2). In another possible implementation, the compensation chiper steps 522, 524, and 526 are omitted, and the selective data sub-pixel removal at 544 is also omitted.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A document processing system, comprising:
    a photoreceptor that continuously moves along a closed path;
    a plurality of raster output scanners (ROSs) located along the closed path of the photoreceptor, the ROSs individually operable to generate a latent image on a portion of the photoreceptor based on a clock input;
    a first clock providing a first clock output signal to the ROSs;
    a second clock providing a second clock output signal to the ROSs, the second clock output signal being or representing a higher frequency than the first clock output signal;
    a plurality of developers individually located downstream of a corresponding one of the ROSs and individually operable to develop toner of a given color on the latent image on the photoreceptor;
    a transfer station located along the closed path downstream of the ROSs and operative to transfer the developed toner from the photoreceptor to a substrate traveling along a first substrate path;
    a fusing station for fixing the transferred toner to the substrate;
    a duplex router receiving the substrate from the fusing station and operative to selectively direct the substrate along a second path;
    a media inverter located along the second path and operative to invert the substrate and to return the inverted substrate to the first path upstream of the transfer station;
    a controller coupled with the ROSs to selectively operate a given ROS according to the first clock signal if the latent image being generated by the given ROS is to be rendered on a first side of the substrate or according to the second clock signal if the latent image being generated by the given ROS is to be rendered on a second side of the substrate; and
    an electronic registration adjustment component operatively coupled with the controller to selectively add or remove at least one sub-pixel to or from image data associated with a given image.

2. The document processing system of claim 1, where the electronic registration adjustment component is operative to selectively add at least one sub-pixel to the image data associated with the given image if the given image is generated using the second clock signal and to selectively remove at least one sub-pixel from the image data associated with the given image if the given image is generated using the first clock signal.

3. The document processing system of claim 2, where the electronic registration adjustment component is operative to selectively add or remove at least one sub-pixel to or from image data associated with a given image only if the given image is a first image generated using one of the first and second clock signals following generation of an immediately preceding image generated using the other of the first and second clock signals.

4. The document processing system of claim 3, where the electronic registration adjustment component is operative to selectively add or remove at least one sub-pixel to or from only an initial portion of the image data associated with the given image.

5. The document processing system of claim 4, where the initial portion of the image data associated with the given image corresponds to a motor polygon assembly (MPA) speed overshoot or undershoot during transition in changing between the first and second clock signals.

6. The document processing system of claim 5, where the initial portion of the image data associated with the given image is adjustable.

7. The document processing system of claim 5, where the initial portion of the image data associated with the given image is predetermined.

8. The document processing system of claim 1, where the electronic registration adjustment component is operative to selectively add at least one sub-pixel to the image data associated with the given image if the given image is generated using the first clock signal.

9. The document processing system of claim 8, where:
if the given image is a first image generated using the second clock signal following generation of an immediately preceding image generated using the first clock signal, the electronic registration adjustment component is operative to selectively add at least one sub-pixel to the image data associated with the given image;
if the given image is a first image generated using the first clock signal following generation of an immediately preceding image generated using the second clock signal, the electronic registration adjustment component is operative to selectively remove at least one sub-pixel from the image data associated with the given image; and
otherwise, the electronic registration adjustment component is operative to selectively add at least one sub-pixel to the image data associated with the given image if the given image is generated using the first clock signal.

10. The document processing system of claim 8, where:
if the given image is a first image generated using the second clock signal following generation of an immediately preceding image generated using the first clock signal, the electronic registration adjustment component is operative to selectively add at least one sub-pixel to the image data associated with the given image;
if the given image is a first image generated using the first clock signal following generation of an immediately preceding image generated using the second clock signal, the electronic registration adjustment component is operative to selectively remove at least one sub-pixel from the image data associated with the given image; and
if the given image is not a first image generated using one of the first and second clock signals following generation of an immediately preceding image generated using the other of the first and second clock signals, the electronic registration adjustment component is operative to selectively add at least one sub-pixel to the image data associated with the given image if the given image is generated using the first clock signal and to selectively remove at least one sub-pixel from the image data associated with the given image if the given image is generated using the second clock signal.

11. A printing method, comprising:
receiving image data for a print job page associated with a next photoreceptor panel zone portion of a photoreceptor that continuously moves along a closed path;
determining if the latent image being generated is to be rendered on a first side or a second side of a substrate;
selecting a first clock speed for operation of a raster output scanner (ROS) if the latent image is to be rendered on the first side of the substrate;
selecting a second clock speed for operation of the ROS if the latent image is to be rendered on the second side of the substrate;
selectively adding at least one sub-pixel to the image data for the next photoreceptor panel zone portion if the image data for the next photoreceptor panel is to be rendered on the second side of the substrate and the image data for the previous photoreceptor panel zone portion was to be rendered on the first side of the substrate; and
selectively generating a latent image on the next panel zone portion of the photoreceptor according to the image data for the next photoreceptor panel using the selected clock speed.

12. The method of claim 11, further comprising selectively removing at least one sub-pixel from the image data for the next photoreceptor panel zone portion if the image data for the next photoreceptor panel is to be rendered on the first side of the substrate and the image data for the previous photoreceptor panel zone portion was to be rendered on the second side of the substrate.

13. The method of claim 12, further comprising selectively adding at least one sub-pixel to the image data for the next photoreceptor panel zone portion if the image data for the next photoreceptor panel is to be rendered on the first side of the substrate and the image data for the previous photoreceptor panel zone portion was to be rendered on the first side of the substrate.

14. The method of claim 13, further comprising selectively removing at least one sub-pixel from the image data for the next photoreceptor panel zone portion if the image data for the next photoreceptor panel is to be rendered on the second side of the substrate and the image data for the previous photoreceptor panel zone portion was to be rendered on the second side of the substrate.

15. The method of claim 12, further comprising selectively removing at least one sub-pixel from the image data for the next photoreceptor panel zone portion if the image data for the next photoreceptor panel is to be rendered on the second side of the substrate and the image data for the previous photoreceptor panel zone portion was to be rendered on the second side of the substrate.

16. The method of claim 11, further comprising selectively adding at least one sub-pixel to the image data for the next photoreceptor panel zone portion if the image data for the next photoreceptor panel is to be rendered on the first side of the substrate and the image data for the previous photoreceptor panel zone portion was to be rendered on the first side of the substrate.

17. The method of claim 16, further comprising selectively removing at least one sub-pixel from the image data for the next photoreceptor panel zone portion if the image data for the next photoreceptor panel is to be rendered on the second side of the substrate and the image data for the previous photoreceptor panel zone portion was to be rendered on the second side of the substrate.

18. The method of claim 11, further comprising selectively removing at least one sub-pixel from the image data for the next photoreceptor panel zone portion if the image data for the next photoreceptor panel is to be rendered on the second side of the substrate and the image data for the previous photoreceptor panel zone portion was to be rendered on the second side of the substrate.

19. A printing method, comprising:

receiving image data for a print job page associated with a next photoreceptor panel zone portion of a photoreceptor that continuously moves along a closed path;

determining if the latent image being generated is to be rendered on a first side or a second side of a substrate;

selecting a first clock speed for operation of a raster output scanner (ROS) if the latent image is to be rendered on the first side of the substrate;

selecting a second clock speed for operation of the ROS if the latent image is to be rendered on the second side of the substrate;

selectively adding at least one sub-pixel to the image data for the next photoreceptor panel zone portion if the image data for the next photoreceptor panel is to be rendered on the first side of the substrate and image data for the previous photoreceptor panel zone portion was to be rendered on the first side of the substrate; and selectively generating a latent image on the next panel zone portion of the photoreceptor according to the image data for the next photoreceptor panel using the selected clock speed.

20. The method of claim 19, further comprising selectively removing at least one sub-pixel from the image data for the next photoreceptor panel zone portion if the image data for the next photoreceptor panel is to be rendered on the second side of the substrate and the image data for the previous photoreceptor panel zone portion was to be rendered on the second side of the substrate.

* * * * *